United States Patent
Hokai et al.

(10) Patent No.: US 12,472,942 B2
(45) Date of Patent: Nov. 18, 2025

(54) CONTROL APPARATUS, CONTROL METHOD, AND NON-TRANSITORY COMPUTER READABLE RECORDING MEDIUM FOR CONTROLLING A MOVING BODY BASED ON AN ESTIMATED POSITION

(71) Applicant: TOYOTA JIDOSHA KABUSHIKI KAISHA, Toyota (JP)

(72) Inventors: Keisuke Hokai, Gotemba (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 18/456,203

(22) Filed: Aug. 25, 2023

(65) Prior Publication Data
US 2024/0132062 A1    Apr. 25, 2024

(30) Foreign Application Priority Data
Oct. 18, 2022   (JP) .................. 2022-166989

(51) Int. Cl.
*B60W 30/09* (2012.01)

(52) U.S. Cl.
CPC .................. *B60W 30/09* (2013.01)

(58) Field of Classification Search
CPC ............... B60W 30/09; B60W 50/038; B60W 2556/30; B60W 50/14; B60W 60/00186; B60W 2050/143; B60W 50/02
See application file for complete search history.

(56) References Cited

U.S. PATENT DOCUMENTS

| | | | | |
|---|---|---|---|---|
| 2014/0297093 | A1* | 10/2014 | Murai | G05D 1/0274 701/27 |
| 2020/0041285 | A1* | 2/2020 | Kato | G09B 29/007 |
| 2020/0072617 | A1 | 3/2020 | Tanaka | |
| 2020/0307640 | A1* | 10/2020 | Tsuji | G05D 1/0268 |
| 2021/0190535 | A1 | 6/2021 | Tomioka et al. | |
| 2022/0074757 | A1* | 3/2022 | Edelman | G01C 21/3644 |
| 2022/0163680 | A1* | 5/2022 | Kato | G01S 19/47 |

FOREIGN PATENT DOCUMENTS

| | | |
|---|---|---|
| JP | 2020-001668 A | 1/2020 |
| JP | 2020-34441 A | 3/2020 |
| JP | 2021-099384 A | 7/2021 |

\* cited by examiner

*Primary Examiner* — Jason Holloway
(74) *Attorney, Agent, or Firm* — Sughrue Mion, PLLC

(57) ABSTRACT

A control apparatus according to the present disclosure is configured to execute the following first to five processes. The first process is a localization of a moving body. The second process is revising an estimated position obtained by the localization such that a displacement amount with respect to a previous position is within a predetermined range. The third process is regarding a revised estimated position obtained as a position of the moving body in a current process, and performing a control of the moving body based on the revised estimated position. The fourth process is detecting a poor accuracy of the localization based on a difference between the estimated position and the revised estimated position. The fifth process is performing an emergency control corresponding to a magnitude of the difference when the poor accuracy of the localization is detected.

5 Claims, 5 Drawing Sheets

CONTROL APPARATUS, CONTROL METHOD, AND NON-TRANSITORY COMPUTER READABLE RECORDING MEDIUM FOR CONTROLLING A MOVING BODY BASED ON AN ESTIMATED POSITION

CROSS-REFERENCE TO RELATED APPLICATIONS

The present application claims priority under 35 U.S.C. § 119 to Japanese Patent Application No. 2022-166989, filed Oct. 18, 2022, the contents of which application are incorporated herein by reference in their entirety.

BACKGROUND

Technical Field

The present disclosure relates to a technique for controlling a moving body based on an estimated position.

Background Art

Patent Literature 1 discloses a host vehicle position estimation device that estimates a position of a vehicle on a map based on an observation position calculated from a recognition result of a target object around the vehicle and a predicted position calculated from a detection result of an internal detection sensor of the vehicle. The host vehicle position estimation device executes processing for determining whether or not the result of estimation is unsteady, and processing for giving more weighting to the prediction position such that the host vehicle position is estimated to be close to the prediction position if it is determined that the result of estimation is unsteady.

Other documents showing the technical level of the technical field according to the present disclosure include the following Patent Literature 2 and Patent Literature 3.

LIST OF RELATED ART

Patent Literature 1: JP 2020/034441 A
Patent Literature 2: JP 2020/001668 A
Patent Literature 3: JP 2021/099384 A

SUMMARY

A localization which estimates the position of a moving body is one of important processes in control of the moving body such as autonomous driving control. The estimated position by the localization may fluctuate abruptly due to factors such as abnormality in sensors. When the estimated position abruptly fluctuates, there is a possibility that the control of the moving body will not be able to follow the estimated position. As a result, there is a possibility that the control of the moving body will continue while the position of the moving body is incorrect. Continuation of such control is undesirable in terms of ensuring control performance. Further, in a moving body such as a vehicle traveling with passengers, there is also a problem from the viewpoint of safety.

According to the technique disclosed in Patent Literature 1, when the prediction position abruptly fluctuates, it is determined that the result of estimates is unsteady, and the weighting to the prediction position becomes higher. However, the prediction position calculated from the detection result of the internal detection sensor generally has a historical error. For this reason, if the weighting to the prediction position becomes higher, there is a possibility that the control of the moving body will continue while the position of the moving body is greatly erroneous.

In view of the above problems, an object of the present disclosure is to provide, regarding control of the moving object based on the estimated position, a technique capable of preventing continuation of control while the position of the moving body is incorrect.

A first aspect of the present disclosure is directed to a control apparatus.

The control apparatus according to the first aspect is configured to execute:
a localization of a moving body;
revising an estimated position obtained by the localization such that a displacement amount with respect to a previous position, which is a position of the moving body estimated in a previous process, is within a predetermined range;
regarding a revised estimated position obtained by the revising the estimated position as a position of the moving body in a current process, and performing a control of the moving body based on the revised estimated position;
detecting a poor accuracy of the localization based on a difference between the estimated position and the revised estimated position; and
performing an emergency control corresponding to a magnitude of the difference when the poor accuracy of the localization is detected.

A second aspect of the present disclosure is directed to a control method.

The control method according to the second aspect includes:
executing a localization of a moving body;
revising an estimated position obtained by the localization such that a displacement amount with respect to a previous position, which is a position of the moving body estimated in a previous process, is within a predetermined range;
regarding a revised estimated position obtained by the revising the estimated position as a position of the moving body in a current process, and performing a control of the moving body based on the revised estimated position;
detecting a poor accuracy of the localization based on a difference between the estimated position and the revised estimated position; and
performing an emergency control corresponding to a magnitude of the difference when the poor accuracy of the localization is detected.

A third aspect of the present disclosure is directed to a control program for controlling a moving body.

The control program according to the third aspect, when executed by a computer, causes the computer to execute:
a localization of the moving body;
revising an estimated position obtained by the localization such that a displacement amount with respect to a previous position, which is a position of the moving body estimated in a previous process, is within a predetermined range;
regarding a revised estimated position obtained by the revising the estimated position as a position of the moving body in a current process, and performing a control of the moving body based on the revised estimated position;

detecting a poor accuracy of the localization based on a difference between the estimated position and the revised estimated position; and performing an emergency control corresponding to a magnitude of the difference when the poor accuracy of the localization is detected.

According to the present disclosure, the estimated position obtained by the localization is revised such that the displacement amount with respect to a position of the moving body estimated in a previous process within the predetermined range. Then, the moving body is controlled based on the revised estimated position obtained by the revising. As a result, it is possible to ensure followability of the control of the moving body even when the estimated position abruptly fluctuates. Further, according to the present disclosure, the poor accuracy of the localization is detected based on the magnitude of the difference between the estimated position and the revised estimated position. And when the poor accuracy of the localization is detected, the emergency control corresponding to the magnitude of the difference is executed. As a result, it is possible to prevent continuation of the control while the position of the moving body is incorrect.

DETAILED DESCRIPTION

The present disclosure relates to control of a moving body. Examples of the moving body include a vehicle and a robot. The moving body may be capable of autonomous traveling. The vehicle may be an autonomous driving vehicle. As an example, a case where the moving body is a vehicle will be considered in the following description. In the case of generalization, "vehicle" in the following description is replaced with "moving body".

1. Control System

Figure 1:
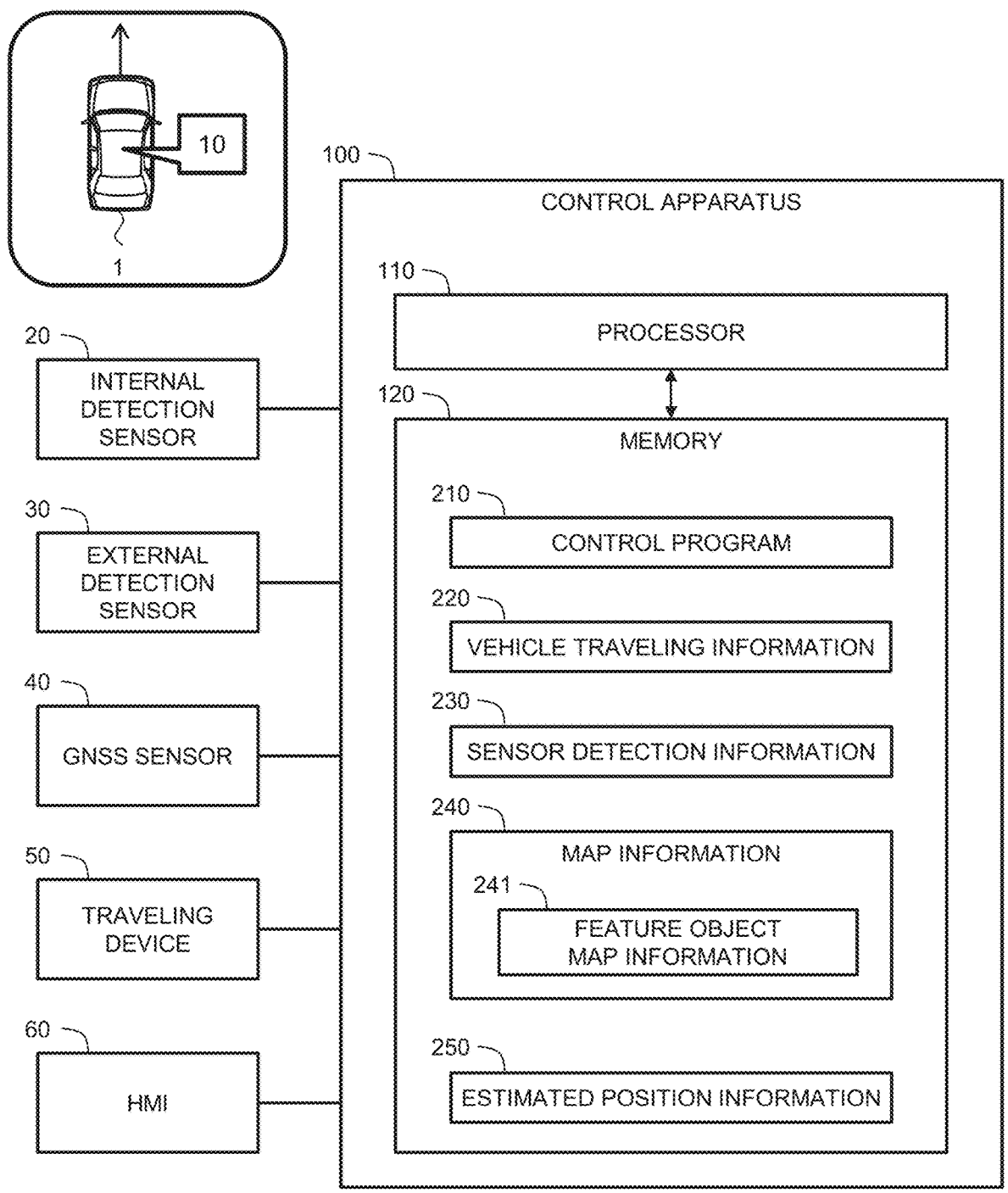
FIG. 1 is a block diagram showing a configuration of a control system according to the present embodiment.

FIG. 1 is a block diagram illustrating a configuration of a control system 10 according to the present embodiment. The control system 10 controls the vehicle 1. The control system 10 includes an internal detection sensor 20, an external detection sensor 30, a global navigation satellite system (GNSS) sensor 40, a traveling device 50, an HMI 60, and a control apparatus 100.

The internal detection sensor 20 is mounted on the vehicle 1 and detects a traveling state of the vehicle 1. Examples of the internal detection sensor 20 include a vehicle speed sensor (wheel speed sensor), a steering angle sensor, an accelerometer, and a yaw rate sensor.

The external detection sensor 30 is mounted on the vehicle 1 and detects a situation around the vehicle 1. Examples of the external detection sensor 30 include LiDAR (Laser Imaging Detection and Ranging), a camera, and a radar.

The GNSS sensor 40 measures the position of the vehicle 1 by receiving signals from satellites.

The traveling device 50 includes a steering device, a driving device, and a braking device. The steering device steers wheels. The driving device generates a driving force. The braking device generates a braking force.

The HMI 60 comprises devices for providing HMI functions in the vehicle 1. Examples of the HMI 60 include a display, a speaker, a touch panel, and the like.

The control apparatus 100 is a computer that controls the vehicle 1. At least, the control apparatus 100 provides a function of estimating the position of the vehicle 1 and controlling the traveling of the vehicle 1 based on the estimated position of the vehicle 1. For example, the control apparatus 100 is an electronic control unit (ECU) that provides an autonomous driving function of the vehicle 1.

The control apparatus 100 includes one or more processors 110 (hereinafter, simply referred to as processor 110) and one or more memories 120 (hereinafter, simply referred to as memory 120). The processor 110 executes various processes to be described later. For example, the processor 110 can be configured by a central processing unit (CPU) including an arithmetic unit, a register, and the like. The memory 120 stores various kinds of information. For example, the memory 120 can be configured by a recording medium such as a volatile memory, a non-volatile memory, a hard disk drive (HDD), or a solid state drive (SSD). Typically, control apparatus 100 is mounted on vehicle 1. Alternatively, a part of the control apparatus 100 may be disposed in an external device outside the vehicle 1 to remotely control the vehicle 1.

The memory 120 stores a control program 210, vehicle traveling information 220, sensor detection information 230, map information 240, estimated position information 250, and the like.

The control program 210 is a computer program for controlling the vehicle 1. When the processor 110 executes the control program 210, various processes by the control apparatus 100 are realized. The control program 210 may be recorded in a computer-readable recording medium.

The vehicle traveling information 220 is information detected by the internal detection sensor 20 and indicates a traveling state of the vehicle 1. Examples of the traveling state of the vehicle 1 include a vehicle speed, a steering angle, an acceleration, a yaw rate, and the like.

The sensor detection information 230 is information detected by the external detection sensor 30. For example, the sensor detection information 230 includes point group information obtained by the LiDAR. As another example, the sensor detection information 230 may include an image captured by a camera.

Furthermore, the sensor detection information 230 includes object information related to an object around the vehicle 1. Examples of the object around the vehicle 1 include a pedestrian, another vehicle, and a feature object. Examples of the feature object include a white line, a curb, a pole, a telephone pole, a signboard, a sign, and a corner of a building. The feature object is used in localization to be described later. The object information includes at least a relative position of the object with respect to the vehicle 1. For example, it is possible to recognize an object and acquire a relative position and a relative speed of the object based on point group information obtained by the LiDAR.

The map information 240 includes a general navigation map. In order to perform localization to be described later, the map information 240 includes characteristic feature object map information 241 for managing information on feature objects on the map. The feature object map information 241 manages at least information on a position (absolute position) of a feature object in an absolute coordinate system on a map. Further, the feature object map information 241 may manage information (classification, attribute, shape, and the like) for specifying a feature object. The feature object map information 241 may be given in advance in accordance with an environment to which the control system 10 according to the present embodiment is applied.

In addition, the map information 240 may include information used for control of the vehicle 1. For example, the map information 240 may include information such as the shape, height, and brightness of a road surface on the map, and information such as the shape and attribute of a structure on the map.

As will be described later, the processor 110 repeatedly executes a process of estimating the position of the vehicle 1 at a predetermined cycle. The estimated position information 250 manages time-series data of the position of the vehicle 1 estimated by the processing executed by the processor 110.

2. Processing

Hereinafter, a process executed by the control apparatus 100, more specifically, a process executed by the processor 110 will be described.

2-1. Localization Processing

The processor 110 executes processing (localization processing) related to localization for estimating the position (absolute position) of the vehicle 1. Hereinafter, the position of the vehicle 1 is simply referred to as a "vehicle position". The initial value of the vehicle position is obtained by, for example, the GNSS sensor 40.

Here, the vehicle position is typically represented by a coordinate position in an absolute coordinate system on a map. Further, the vehicle position may include an attitude (a roll angle, a pitch angle, and a yaw angle) of the vehicle 1. In this case, the vehicle position is generally represented by a vector having six elements. Alternatively, the vehicle position can be represented by a rigid transformation matrix with respect to a reference coordinate position and attitude. For example, assuming that a translation vector having a size of 3×1 representing translation with respect to a reference three dimensional coordinate position is r and a rotation matrix having a size of 3×3 representing rotation with respect to the attitude of the vehicle 1 about the reference three axes is R, the vehicle position can be represented by a rigid transformation matrix M having a size of 4×4 in the following formula. In this case, the vector representation of the coordinate position of the vehicle position is obtained by applying a rigid transformation matrix to a vector representing a reference coordinate position. The attitude of the vehicle 1 at the vehicle position is obtained by applying the rotation matrix R to the attitude of the vehicle 1 serving as a reference.

$$M = \begin{bmatrix} R & r \\ 0 & 1 \end{bmatrix}$$ Formula 1

Hereinafter, an example of the localization process executed by the processor 110 will be described.

First, the processor 110 calculates a rough vehicle position (hereinafter referred to as a "pre-estimated position") based on the vehicle traveling information 220 and the vehicle position estimated in the previous processing. For example, the processor 110 calculates the movement amount (displacement amount) of the vehicle 1 based on the steering angle and the vehicle speed of the vehicle 1, and calculates the pre-estimated position based on the movement amount. In addition, for example, the processor 110 calculates the prior estimated position from a state equation configured with the vehicle position as a state and the vehicle traveling information 220 as an explanatory variable. The processor 110 can acquire the vehicle position estimated in the previous processing by referring to the estimated position information 250. Hereinafter, the vehicle position estimated in the previous processing is simply referred to as a "previous position".

Next, the processor 110 recognizes a feature object around the vehicle 1 based on the sensor detection information 230. Further, the processor 110 estimates the absolute position of the recognized feature object by combining the calculated pre-estimated position and the relative position of the recognized feature object. The processor 110 associates the recognized characteristic feature object with the feature object managed by the characteristic object map information 241 on the basis of the feature object map information. Then, the processor 110 corrects the pre-estimated position of the recognized feature object so that the estimated absolute position matches the absolute position obtained from the feature object map information 241 as much as possible. For example, the processor 110 corrects the pre-estimated position by a particle filter, a Kalman filter, or the like using the vehicle position as a state and the estimated position of the recognized feature object as observation data. The processor 110 sets the vehicle position obtained by correcting the pre-estimated position as a processing result of the localization processing.

As an example, the processor 110 executes the localization process. In the control system 10 according to the present embodiment, the processor 110 may employ an algorithm different from the localization process described above. The vehicle position obtained by the processor 110 executing the localization estimation process is hereinafter simply referred to as an "estimated position". The estimated position may be given by a probability distribution in which each element of the vehicle position is a random variable.

2-2. Filtering Processing

In the control system 10 according to the present embodiment, the processor 110 further executes processing (filtering processing) for correcting the estimated position. In the filtering processing, the processor 110 corrects the estimated position so that the displacement amount with respect to the previous position falls within a predetermined range. Here, the predetermined range may be suitably given in accordance with an environment to which the control system 10 according to the present embodiment is applied. Typically, the predetermined range is a range that can be followed in the control of vehicle 1. However, it is not desirable to unnecessarily narrow the predetermined range because the nominal performance of the control is significantly reduced. The vehicle position obtained by the processor 110 performing the filtering processing is hereinafter simply referred to as a "revised estimated position".

Some examples of the filtering processing executed by the processor 110 will be described below.

In a first example, a fixed upper limit value is set for the displacement amount for each element of the previous position, and the revised estimated position is calculated so as to limit each element of the estimated positioned. According to the first example, for one element of the vehicle position, assuming that the estimated position is $x_{est}$, the previous position is $x_{lp}$, and the fixed upper limit value is $x_{max}$, the processor 110 can calculate the revised estimated position by $x_{out}$ in the following formula. When the vehicle position includes a plurality of elements, the following formula may be applied to each element. In this case, the fixed upper limit value may be different for each element.

$$x_{out} = \begin{cases} x_{1p} - x_{max} & \text{if } (x_{est} - x_{1p}) \leq -x_{max} \\ x_{1p} + x_{max} & \text{if } (x_{est} - x_{1p}) \geq x_{max} \\ x_{est} & \text{otherwise} \end{cases} \quad \text{Formula 2}$$

Figure 2A:
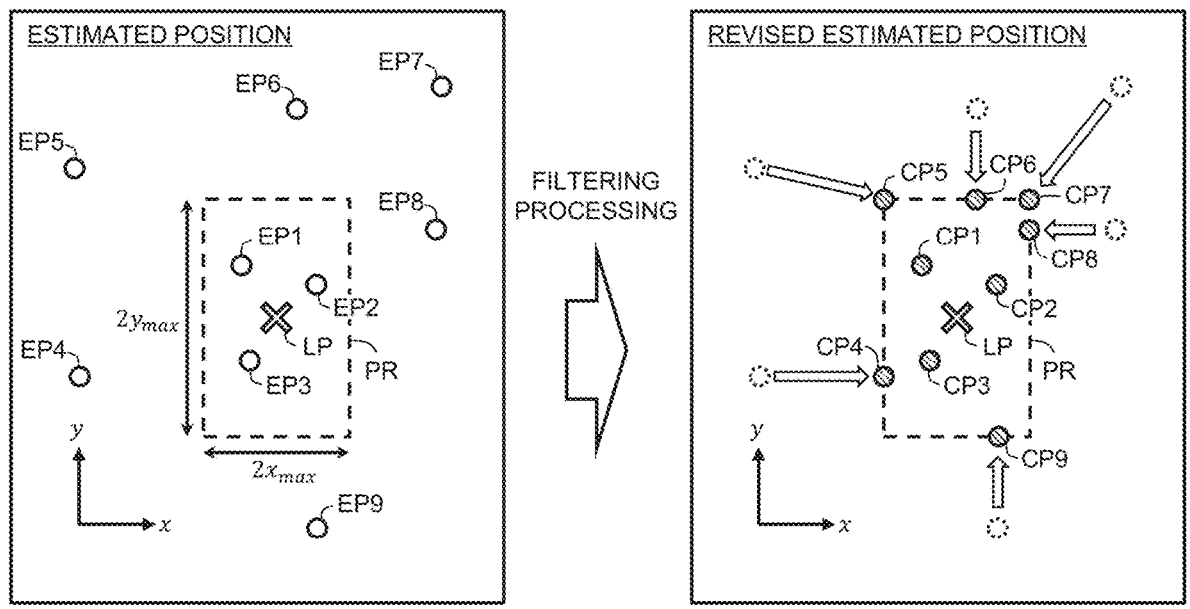
FIG. 2A is a conceptual diagram showing an example of revising an estimated position.

FIG. 2A is a conceptual diagram illustrating an example of correction of an estimated positioned by a first example of filtering processing in a case where a vehicle position is represented by a two dimensional coordinate position (x, y). In FIG. 2A, for several examples (CPi (i=0, 1, . . . , 9)) of the revised estimated position for several examples (EPi (i=0, 1, . . . , 9)) of the estimated position. In FIG. 2A, LP indicates the previous position.

As shown in FIG. 2A, according to the first example of the filtering processing, the displacement amount of the revised estimated position with respect to the previous position LP is within the predetermined range PR. Here, in the first example, the predetermined range PR is a rectangular range defined by fixed upper limits $(x_{max}, y_{max})$ with the previous position LP as the center. When the estimated position is within the predetermined range PR, the estimated position and the revised estimated position match each other. For example, in FIG. 2a, the estimated positions EP1, EP2, and EP3 coincide with the revised estimated positions CP1, CP2, and CP3.

In a second example, a predetermined range including the previous position is defined, and the revised estimated position is calculated so as to be within the defined predetermined range. The predetermined range including the previous position is, for example, an ellipse centered on the previous position. In this case, according to the second example, assuming that the vehicle position is a two dimensional coordinate position, the estimated position is $(x_{est}, y_{est})$, the previous position is $(x_{lp}, y_{lp})$, and parameters defining the lengths of the major axis and the minor axis of the ellipse are $(x_{max}, y_{max})$, the processor 110 can calculate the revised estimated position by $(x_{out}, y_{out})$ in the following formula. When the vehicle position is a three dimensional coordinate position, expansion is easy. When the vehicle position includes the attitude of the vehicle 1, the following formula may be similarly applied to the attitude of the vehicle 1.

$$x_{out} = \begin{cases} x_{max} \frac{x_{norm}}{|u_{norm}|} & \text{if } |u_{norm}| > 1.0 \\ x_{est} & \text{otherwise} \end{cases} \quad \text{Formula 3}$$

$$y_{out} = \begin{cases} y_{max} \frac{y_{norm}}{|u_{norm}|} & \text{if } |u_{norm}| > 1.0 \\ y_{est} & \text{otherwise} \end{cases}$$

$$u_{norm} = (x_{norm}, y_{norm}) = \left( \frac{x_{est} - x_{1p}}{x_{max}}, \frac{y_{est} - y_{1p}}{y_{max}} \right)$$

Figure 2B:
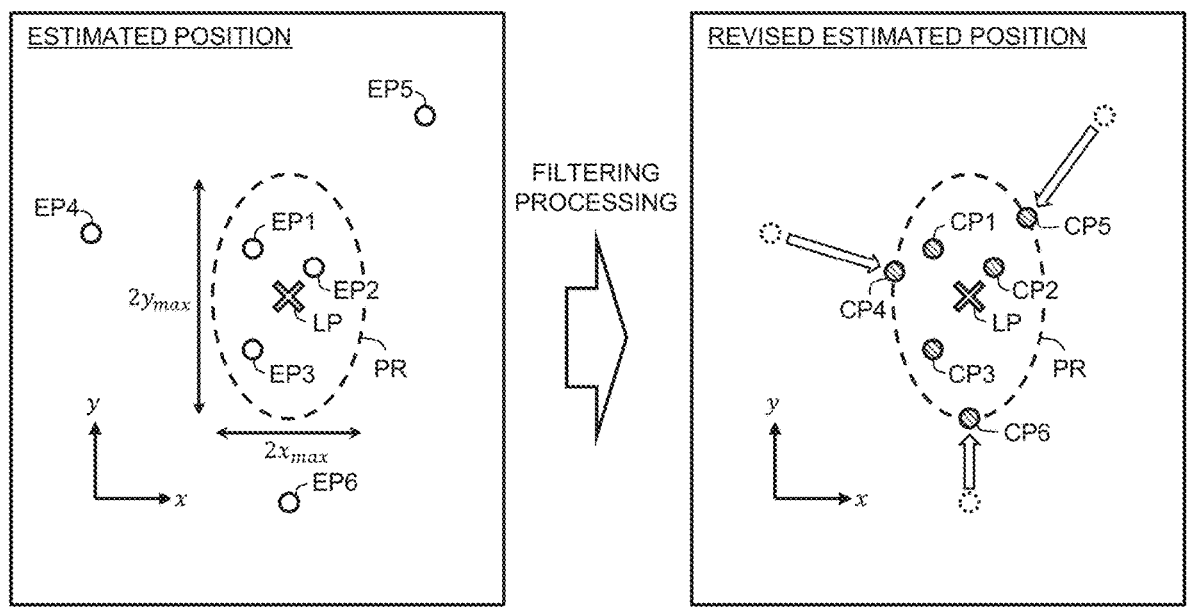
FIG. 2B is a conceptual diagram showing an another example of the revising an estimated position.

FIG. 2B is a conceptual diagram illustrating an example of correction of an estimated positioned by a second example of filtering processing in a case where a vehicle position is represented by a two dimensional coordinate position (x, y). Here, the predetermined range PR including the previous position LP is an ellipse defined by parameters $(x_{max}, y_{max})$ with the previous position LP as a center. As shown in FIG. 2B, also in the second example, the displacement amount of the revised estimated position with respect to the previous position LP is within the predetermined range PR.

In the second example, the predetermined range may be defined so as to give a constant upper limit value to the displacement rate with respect to the previous position. For example, if the parameters defining the lengths of the major and minor axes of the ellipse are $(x_{max}, y_{max}) = (\Delta t \times v_{xmax}, \Delta t \times v_{ymax})$ in the above formula, it is possible to define a predetermined range in which a constant upper limit value $(v_{xmax}, v_{ymax})$ is given to the displacement rate with respect to the previous position for each component of the vehicle position. $\Delta t$ is a time difference between the previous processing and the current processing.

In a third example, a fixed upper limit value is set for the displacement rate for each element of the previous position, and the revised estimated position is calculated so as to limit each element of the estimated positioned. According to the third example, for one element of the vehicle position, when the fixed upper limit value is $v_{max}$, the time difference between the previous processing and the current processing is $\Delta t$, and the other expressions are the same as those in the first example, the processor 110 can calculate the revised estimated position by $x_{out}$ in the following formula.

$$x_{out} = \begin{cases} x_{1p} - \Delta t * v_{max} & \text{if } (x_{est} - x_{1p}) \leq -\Delta t * v_{max} \\ x_{1p} + \Delta t * v_{max} & \text{if } (x_{est} - x_{1p}) \geq \Delta t * v_{max} \\ x_{est} & \text{otherwise} \end{cases} \quad \text{Formula 4}$$

Also in the third example, the displacement amount of the revised estimated position with respect to the previous position can be within the predetermined range. In particular, in terms of the displacement rate, it is possible to provide a predetermined range as a range that can be followed in the control of the vehicle 1. The predetermined range in the third example is equivalent to the case illustrated in FIG. 2a, and is a rectangular range defined by a constant upper limit value $v_{max}$ with the previous position LP as the center.

As described above, the processor 110 calculates the corrected estimated position by correcting the revised estimated position such that the displacement amount with respect to the previous position falls within the predetermined range by executing the filtering processing. In the control system 10 according to the present embodiment, the revised estimated position is finally estimated as the position of the vehicle 1. That is, the previous position is the corrected revised estimated position calculated in the previous processing. The processor 110 stores the revised estimated position calculated by executing the filtering processing in the estimated position information 250 of the memory 120 as the position of the vehicle 1 estimated in the current processing.

2-3. Poor Accuracy Detection Processing

The processor 110 executes processing (poor accuracy detection processing) of detecting poor accuracy of self-position estimation based on the magnitude of the difference between the estimated position obtained by execution of the localization processing and the revised estimated position obtained by execution of the filtering processing. The revised estimated position is calculated such that a displacement amount with respect to the previous position is within a predetermined range. Therefore, it is considered that a large difference between the estimated position and the revised estimated position indicates that the estimated position is rapidly changed from the previous position. Therefore, the magnitude of the difference between the estimated position and the revised estimated position serves as an index for evaluating the accuracy of localization-position estimation.

Here, the difference between the estimated position and the revised estimated position is given as follows, for example.

When the vehicle position is represented by a vector, the difference between the estimated position and the revised estimated position may be a vector of a difference between a vector representing the estimated position and a vector representing the revised estimated position. When the vehicle position is a vector having the coordinate position and the attitude of the vehicle 1 as elements, the difference between the estimated position and the revised estimated position may be calculated separately for the coordinate position and the attitude of the vehicle 1.

When the vehicle position is represented by a rigid transformation matrix, the difference between the estimated position and the revised estimated position can be calculated by $M_{dif}$ in the following formula, where $M_{est}$ is a rigid transformation matrix representing the estimated positioned and $M_{out}$ is a rigid transformation matrix representing the revised estimated positioned. By extracting the translation vector r of $M_{dif}$, the vector representation of the difference between the estimated position and the revised estimated position related to the coordinate position can be obtained. Further, by extracting the rotation matrix R of $M_{dif}$ and converting it into the Euler angle, it is possible to obtain the vector representation of the difference between the estimated position and the revised estimated position related to the attitude of the vehicle 1.

$$M_{dif} = M_{est} * (M_{out})^{-1} \qquad \text{Formula 5}$$

In the poor accuracy detection process, the processor 110 can be configured to detect that the localization is poor accuracy when, for example, the magnitude of the difference between the estimated position and the revised estimated position exceeds a predetermined threshold (first threshold). The fact that the magnitude of the difference exceeds the first threshold value can be determined, for example, from the fact that the norm of the vector representing the difference exceeds the first threshold value with the first threshold value being a scalar value. Alternatively, the first threshold value may be set as a boundary of a region in the vector space, and the determination may be made based on the fact that the vector representing the difference is outside the region. In addition, the processor 110 may be configured to detect that the localization has poor accuracy on condition that a state in which the magnitude of the difference exceeds the first threshold value continues for a certain period of time or the magnitude of the difference exceeds the first threshold value a predetermined number of times or more during a certain period of time.

2-4. Traveling Control Processing

The processor 110 executes a process (traveling control process) of controlling traveling of the vehicle 1 based on the revised estimated position obtained by executing the filtering processing. The processor 110 generates a control signal for the traveling device 50 or the HMI 60 by executing the traveling control process. For example, when autonomous driving of the vehicle 1 is performed, the processor 110 generates a traveling plan including driving decision and a traveling track from the revised estimated positioned and the map information 240. Then, the processor 110 generates control signals related to acceleration, braking, and steering so that the vehicle 1 travels according to the generated traveling plan.

In particular, the processor 110 executes the process of performing the emergency control according to the magnitude of the difference between the estimated position and the revised estimated position in response to the detection of the poor accuracy of the localization-position estimation in the poor accuracy detection process. Examples of the emergency control include an interruption procedure of autonomous driving, issuance of an alarm to an operator of the vehicle 1, control for performing evacuation by deceleration, and control for performing evacuation by stop.

Figure 3:
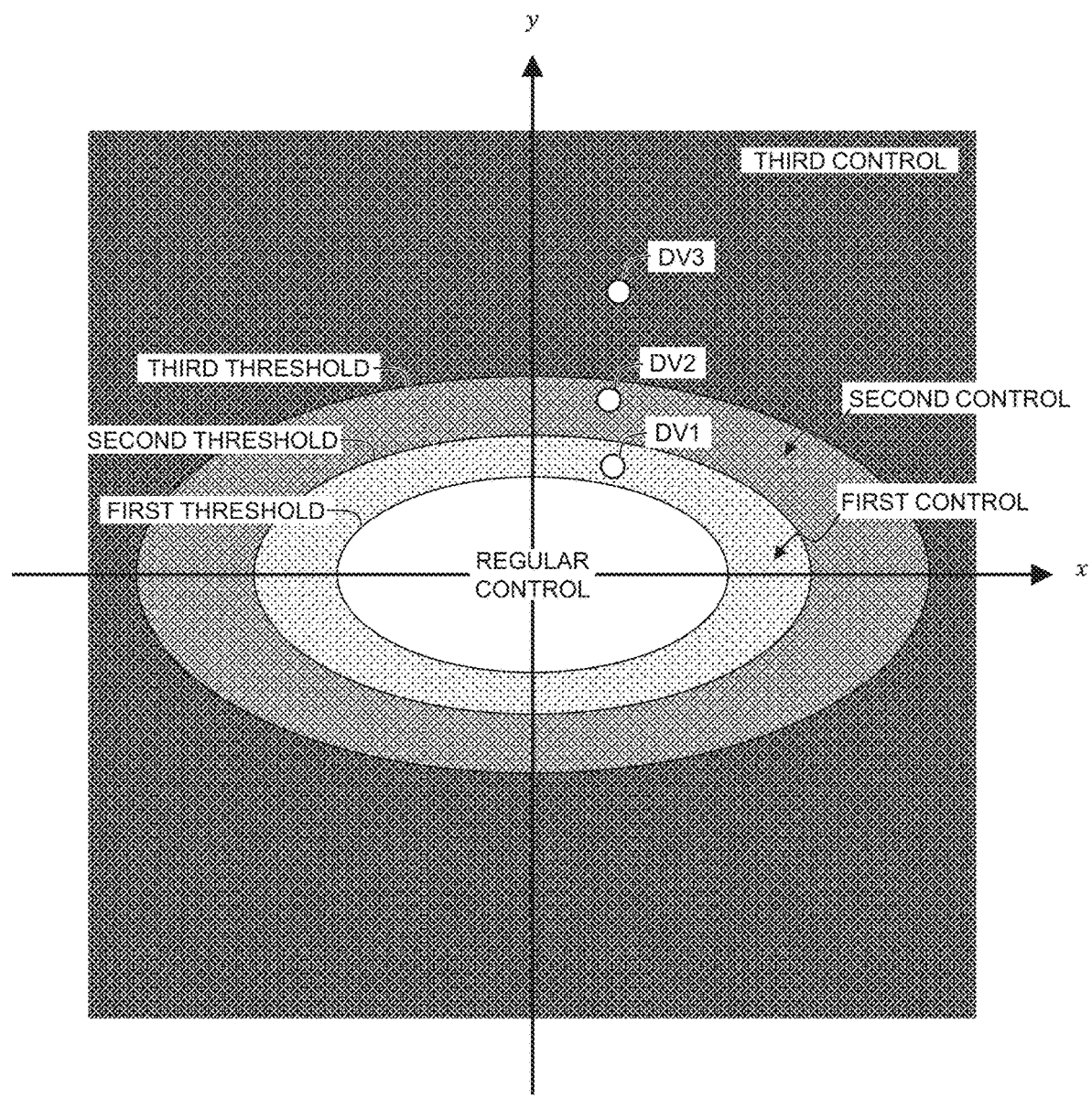
FIG. 3 is a conceptual diagram showing an example of switching an emergency control corresponding to a magnitude of a difference between the estimated position and a revised estimated position.

The processor 110 may be configured to switch between these emergency controls in accordance with the magnitude of the difference between the estimated position and the revised estimated position. For example, with respect to the vector of the difference between the estimated position and the revised estimated positioned, the processor 110 determines switching of the emergency control as shown in FIG. 3. In FIG. 3, a first threshold, a second threshold, and a third threshold are boundaries of regions in the vector space. In the case shown in FIG. 3, the processor 110 executes the first control when the magnitude of the difference vector (DV1, DV2, DV3) exceeds the first and does not exceed the second (DV1), executes the second control when the magnitude exceeds the second and does not exceed the third (DV2), and executes the third control when the magnitude exceeds the third (DV3). When the first threshold value is not exceeded, the processor 110 performs regular control. With this configuration, it is possible to determine the poor accuracy of the localization step by step, and to execute appropriate control according to the degree of the poor accuracy failure. For example, by setting the first control to issue an alarm, the second control to retract by deceleration, and the third control to retract by stop, it is possible to request the operator to deal with the alarm, secure the control performance by deceleration, and secure the safety by stop in a stepwise manner.

The traveling device 50 and the HMI 60 operate in accordance with the control signal generated by the processor 110 executing the traveling control process, whereby the control of the vehicle 1 by the control apparatus 100 is realized.

2-5. Flowchart

Figure 4:
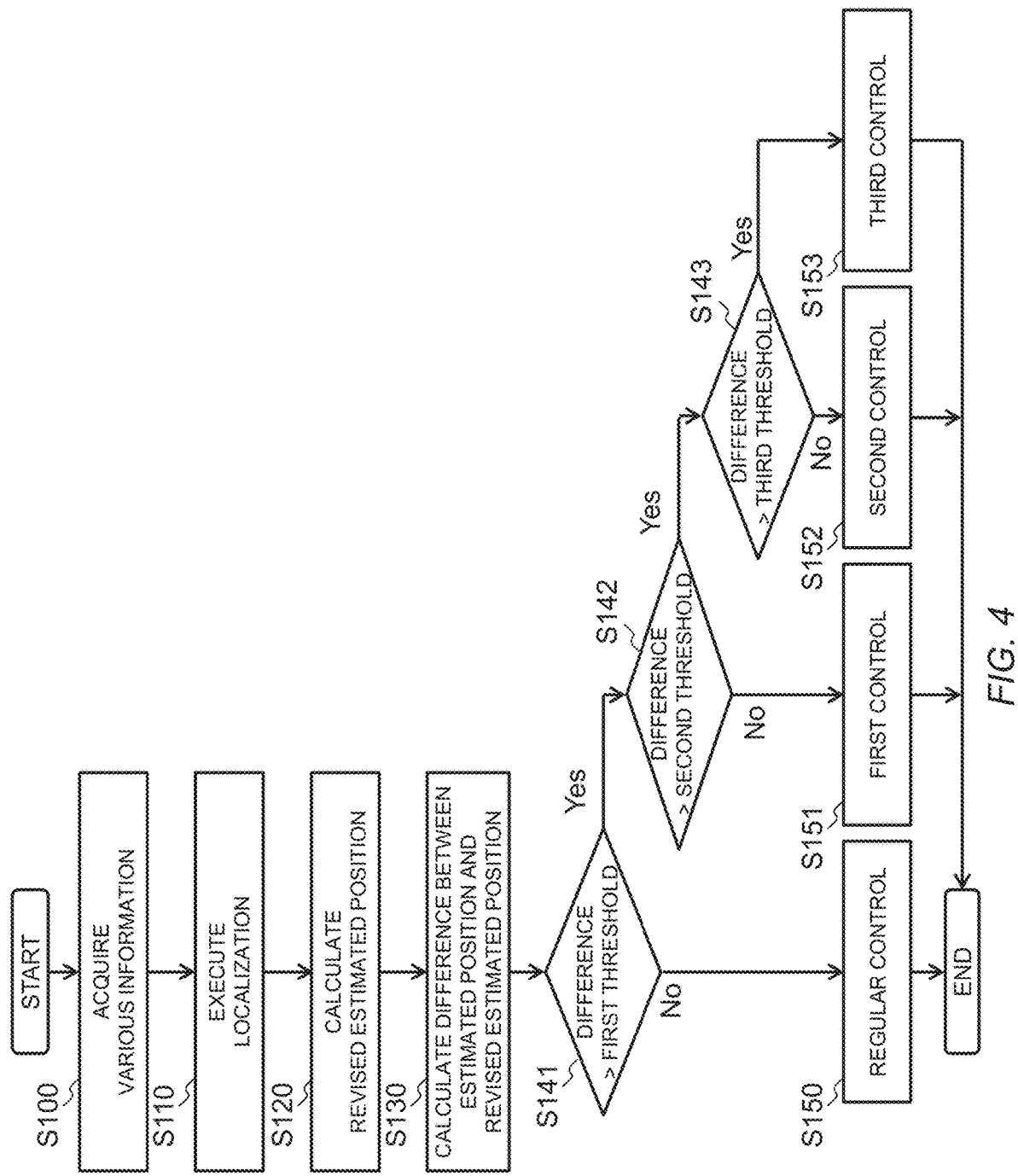
FIG. 4 is a flowchart showing an example of processes executed by a control apparatus.

FIG. 4 is a flowchart illustrating an example of processing executed by the processor 110. The flowchart shown in FIG. 4 may be repeatedly executed at predetermined intervals.

In step S100, the processor 110 acquires various kinds of information stored in the memory 120.

In step S110, the processor 110 executes a localization process to calculate an estimated position.

In step S120, the processor 110 executes filtering processing to calculate a revised estimated position.

In step S130, the processor 110 calculates a difference between the estimated position calculated in step S110 and the revised estimated position calculated in step S120.

When the magnitude of the difference calculated in step S130 does not exceed the first reference value (step S141; No), the processor 110 executes the regular control in the travel control process (step S150).

When the magnitude of the difference calculated in step S130 exceeds the first reference value (step S141; Yes), the processor 110 detects that the localization has poor accuracy. Then, when the magnitude of the difference exceeds the first threshold-value (step S141; Yes) and does not exceed the second threshold-value (step S142; No), the processor 110 executes the first control for issuing an alarm (step S151). When the magnitude of the difference exceeds the second reference value (step S142; Yes) and does not exceed the third reference value (step S143; No), the second control is executed (Step S152) to perform the evacuation by deceleration. When the magnitude of the difference exceeds the third reference value (step S143; Yes), the processor 110 executes the third control for performing saving by stopping (step S153).

In this way, the control apparatus 100 executes the processing. In addition, a control method related to control of the vehicle 1 is realized by the control apparatus 100 executing the processing as described above.

3. Effect

As described above, according to the present embodiment, the estimated position obtained by the localization is corrected such that the displacement amount with respect to the position of the vehicle 1 estimated in the previous processing falls within the predetermined range. Then, the vehicle 1 is controlled based on the revised estimated position obtained by the correction. As a result, it is possible to ensure the follow-up performance of the control of the vehicle 1 even when a sudden change occurs in the estimated position. Consequently, a smooth behavior of the vehicle 1 can be realized. Further, according to the present embodiment, the poor accuracy of the self-localization is detected based on the magnitude of the difference between the estimated position and the revised estimated position. Then, in response to the detection of the poor accuracy of the localization, emergency control corresponding to the magnitude of the difference is executed. Accordingly, in a case where the magnitude of the difference between the estimated position and the revised estimated position is excessively large and there is a possibility that the control is continued while the position of the vehicle 1 is erroneous, it is possible to perform interruption of the autonomous driving or the like. Consequently, it is possible to prevent the control from being continued while the position of the vehicle 1 is incorrect.

Figure 5:
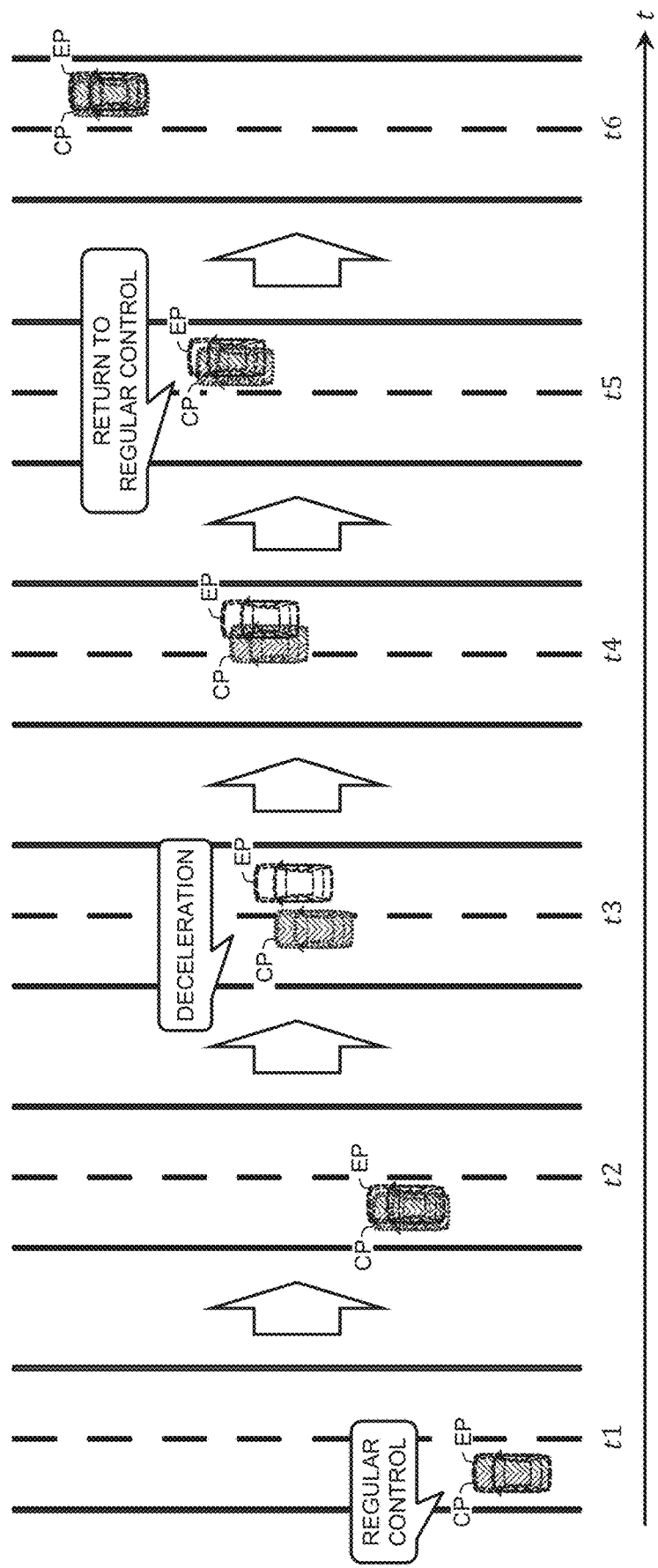
FIG. 5 is a conceptual diagram showing a practical example of the control system according to the present embodiment.

FIG. 5 is a conceptual diagram illustrating an example of control of the vehicle 1 by the control system 10 according to the present embodiment. FIG. 5 illustrates a scene in which the vehicle 1 is about to change lanes by autonomous driving. In FIG. 5, the estimated position EP and the revised estimated position CP calculated at each time (t1, . . . , t6) are shown.

At the time t1, the estimated position EP and the revised estimated position CP coincide with each other. Next, at the time t2, the estimated position EP and the revised estimated position CP substantially coincide with each other although there is a slight difference therebetween. Therefore, from time t1 to time t2, the control apparatus 100 performs control of the vehicle 1 by regular control.

Next, at time t3, a rapid change occurs in the estimated position EP. On the other hand, since the control apparatus 100 performs the control based on the revised estimated position CP, the influence of the rapid variation on the control is suppressed. Further, at time t3, since the difference between the estimated position EP and the revised estimated position CP is large to a certain extent, the control apparatus 100 detects the poor accuracy of the localization and decelerates the vehicle 1 by the emergency control. Accordingly, it is expected that the difference between the estimated position EP and the revised estimated position CP becomes small after the time t3. At this time, the control apparatus 100 may be configured to issue a warning to the operator of the vehicle 1 to notify the operator that the poor accuracy of the localization is detected and the control for decelerating the vehicle 1 is being performed.

Next, at time t5, the difference between the estimated position EP and the revised estimated position CP is reduced to a certain extent. At this time, the control apparatus 100 may be configured to return to the regular control and control the vehicle 1. Alternatively, the control apparatus 100 may be configured to notify the operator that the poor accuracy of localization-position estimation has been solved. In this case, it is assumed that the operator determines the return to the regular control in consideration of safety. Then, the control apparatus 100 returns to the regular control and performs control of the vehicle 1 in response to the determination of the return to the regular control by the operator. When the difference between the estimated position EP and the revised estimated position CP further increases after time t3, the control apparatus 100 may execute emergency control for securing safety such as stopping of the vehicle 1.

As described above, according to the present embodiment, it is possible to prevent the control from being continued with the position of the vehicle 1 being incorrect while realizing smooth behavior of the vehicle 1.

What is claimed is:

1. A control apparatus configured to execute:
   a localization of a moving body to obtain an estimated position of the moving body;
   calculating a revised estimated position by revising the estimated position such that a displacement amount of the revised estimated position with respect to a previous position is within a predetermined range, the previous position being a position of the moving body estimated in a previous process;
   regarding the revised estimated position obtained by the revising the estimated position as a position of the moving body in a current process, and performing a control of the moving body based on the revised estimated position;
   detecting whether there is a poor accuracy of the localization based on a difference between the estimated position and the revised estimated position; and
   performing an emergency control corresponding to a magnitude of the difference between the estimated position and the revised estimated position based on the poor accuracy of the localization being detected.

2. The control apparatus according to claim 1, wherein calculating the revised estimated position comprises limiting the estimated position by setting an upper limit on a displacement rate with respect to the previous position.

3. The control apparatus according to claim 1, wherein the poor accuracy of the localization is detected based on the magnitude of the difference exceeding a first threshold, and
   the emergency control includes:
   a first control of issuing an alarm to be executed based on the magnitude of the difference exceeding the first threshold but not exceeding a second threshold;

a second control of performing evacuation by deceleration to be executed based on the magnitude of the difference exceeding the second threshold but not exceeding a third threshold; and a third control of performing evacuation by stop to be executed based on the magnitude of the difference exceeding the third threshold.

4. A control method including:

executing a localization of a moving body to obtain an estimated position of the moving body;

calculating a revised estimated position by revising the estimated position such that a displacement amount of the revised estimated position with respect to a previous position is within a predetermined range, the previous position being a position of the moving body estimated in a previous process;

regarding the revised estimated position obtained by the revising the estimated position as a position of the moving body in a current process, and performing a control of the moving body based on the revised estimated position;

detecting whether there is a poor accuracy of the localization based on a difference between the estimated position and the revised estimated position; and performing an emergency control corresponding to a magnitude of the difference between the estimated position and the revised estimated position based on the poor accuracy of the localization being detected.

5. A non-transitory computer readable recording medium on which a computer program for controlling a moving body is recorded, the computer program, when executed by a computer, causing the computer to execute:

a localization of a moving body to obtain an estimated position of the moving body;

calculating a revised estimated position by revising the estimated position such that a displacement amount of the revised estimated position with respect to a previous position, is within a predetermined range, the previous position being a position of the moving body estimated in a previous process;

regarding the revised estimated position obtained by the revising the estimated position as a position of the moving body in a current process, and performing a control of the moving body based on the revised estimated position;

detecting whether there is a poor accuracy of the localization based on a difference between the estimated position and the revised estimated position; and performing an emergency control corresponding to a magnitude of the difference between the estimated position and the revised estimated position based on the poor accuracy of the localization being detected.

* * * * *